United States Patent
Kern et al.

(10) Patent No.: US 9,525,295 B2
(45) Date of Patent: Dec. 20, 2016

(54) ELECTRIC DEVICE AND METHOD FOR OPERATING AN ELECTRIC DRIVE

(71) Applicant: Robert Bosch GmbH, Stuttgart (DE)

(72) Inventors: Stefan Kern, Frankfurt am Main (DE); Andreas Friese, Pfalzgrafenweiler (DE); Andreas Kynast, Stuttgart (DE); Philipp Zipf, Stuttgart-Zuffenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 517 days.

(21) Appl. No.: 13/853,658

(22) Filed: Mar. 29, 2013

(65) Prior Publication Data

US 2013/0257386 A1    Oct. 3, 2013

(30) Foreign Application Priority Data

Mar. 30, 2012 (DE) .......... 10 2012 205 260

(51) Int. Cl.
    *H02J 7/00* (2006.01)
    *H02J 7/04* (2006.01)
    *H02J 7/14* (2006.01)

(52) U.S. Cl.
    CPC ............ *H02J 7/0063* (2013.01); *H02J 7/0013* (2013.01); *H02J 7/1423* (2013.01); *H02J 7/0031* (2013.01); *H02J 2007/0067* (2013.01)

(58) Field of Classification Search
    USPC ........ 320/116, 117, 118, 119, 120, 121, 122, 320/123, 124, 125, 126, 127, 128, 129, 320/130, 131, 132, 133, 134
    See application file for complete search history.

(56) References Cited

U.S. PATENT DOCUMENTS

| | | | | |
|---|---|---|---|---|
| 5,838,136 A | * | 11/1998 | Waugh | 320/106 |
| 5,886,503 A | * | 3/1999 | McAndrews | G01R 31/3658 320/121 |
| 5,977,652 A | * | 11/1999 | Frey et al. | 307/10.1 |
| 6,583,603 B1 | * | 6/2003 | Baldwin | 320/121 |
| 2008/0036419 A1 | * | 2/2008 | Cook et al. | 320/104 |
| 2009/0218989 A1 | * | 9/2009 | Davis | 320/136 |
| 2010/0320969 A1 | * | 12/2010 | Sakakibara et al. | 320/118 |
| 2012/0013304 A1 | * | 1/2012 | Murase | B60L 11/1864 320/116 |
| 2012/0091963 A1 | * | 4/2012 | Vance et al. | 320/118 |
| 2012/0176095 A1 | * | 7/2012 | Okuda et al. | 320/134 |
| 2013/0063091 A1 | * | 3/2013 | Nishi et al. | 320/126 |
| 2014/0339891 A1 | * | 11/2014 | Ohkawa et al. | 307/9.1 |

FOREIGN PATENT DOCUMENTS

| | | |
|---|---|---|
| CN | 201261400 Y | 6/2009 |
| CN | 201414022 Y | 2/2010 |
| CN | 201742134 U | 2/2011 |

* cited by examiner

*Primary Examiner* — Alexis A Boateng
(74) *Attorney, Agent, or Firm* — Norton Rose Fulbright US LLP; Gerard Messina

(57) ABSTRACT

In a method for operating an electric device, which includes a first storage battery pack, a second storage battery pack and an electrical load, no more than one storage battery pack is discharged at any given time to operate the load. In the process, the storage battery pack to be discharged is selected as a function of a temperature of the first storage battery pack and a temperature of the second storage battery pack and/or as a function of an internal resistance of the first storage battery pack and an internal resistance of the second storage battery pack.

8 Claims, 3 Drawing Sheets

ELECTRIC DEVICE AND METHOD FOR OPERATING AN ELECTRIC DRIVE

CROSS REFERENCE

The present application claims the benefit under 35 U.S.C. §119 of German Patent Application No. DE 102012265260.7 filed on Mar. 30, 2012, which is expressly incorporated herein by reference in its entirety.

FIELD

The present invention relates to a method for operating an electric device, and to an electric device.

BACKGROUND INFORMATION

Conventionally, electric devices, such as electric tools, may be equipped with accumulators (rechargeable storage batteries) in order to operate the devices independently of a supply network. For portable electric devices, lithium-ion storage batteries are often used, which have an advantageous ratio between energy density and weight as well as size. It is conventional to develop storage batteries of electric devices as self-contained and possibly exchangeable units, so-called storage battery packs.

Lawn mowers, for instance, are often designed as electric devices operated with the aid of storage batteries. However, due to the limited energy capacity of conventional storage batteries, such lawn mowers are unable to compete with gasoline-operated lawn mowers as far as output and operating times are concerned. Larger areas cannot be mowed without interrupting the task in order to recharge the storage battery of the lawn mower. Another disadvantage is the high power consumption during longer mowing periods under more difficult conditions such as high or wet grass. This leads to considerable heating of the storage battery, which adversely affects its service life. In addition, the battery pack must first cool down after the exchange before it can be recharged. This makes it necessary to interrupt the work for longer intervals.

SUMMARY

An object of the present invention is to provide a better method for operating an electric device.

In an example method for operating an electric device according to the present invention, which device includes a first storage battery pack, a second storage battery pack and an electrical load, no more than one storage battery pack is discharged at any given time to operate the load. In so doing, the storage battery pack to be discharged is selected as a function of a temperature of the first storage battery pack and a temperature of the second storage battery pack and/or as a function of an internal resistance of the first storage battery pack and an internal resistance of the second storage battery pack. Heating of the first storage battery pack and the second storage battery pack then advantageously takes place uniformly, so that peak heating of the storage battery packs occurs less frequently. This increases the service life of the storage battery pack.

In one preferred specific embodiment of the method, the storage battery pack having the lowest temperature is discharged. This advantageously avoids excessive heating of the storage battery packs of the electric device.

In one expedient specific embodiment of the example method, discharging of a storage battery pack is terminated once the temperature of the storage battery pack reaches a specified threshold value. This advantageously makes it possible to prevent overheating of the storage battery pack.

In one further development of the method, the first storage battery pack and the second storage battery pack are discharged in alternation when the temperature of the first storage battery pack and the temperature of the second storage battery pack deviate from each other by less than a specified threshold value. The two storage battery packs then advantageously heat up to approximately the same extent; because of the alternating operation of the two storage battery packs, the overall heating of the storage battery packs is lower than would be possible if only one storage battery pack was discharged. This advantageously provides a longer operating time than would be possible in sequential discharging of the storage battery packs, one after another. The threshold value, below which the temperatures of the storage battery packs may be judged to be approximately equal, may lie at 2° C., for example.

In one especially preferred specific embodiment of the method, a change between the storage battery packs takes place more frequently than once per minute. System inertia then advantageously causes both storage battery packs to always have approximately the same temperature. In addition, the discharging of the storage battery packs also takes place approximately uniformly. This advantageously prevents a user of the electric device from noticing a power change when switching between the storage battery packs.

In one additional further development of the method, the storage battery pack having the lowest internal resistance is discharged if a required electrical output exceeds a specified threshold value. This advantageously makes it possible to absorb briefly required peak outputs. The use of the storage battery pack having the lowest resistance advantageously results in lowest heating. The method may advantageously be developed in such a way that in the event of a briefly required peak output, the storage battery pack having the lowest internal resistance is selected for discharge even if it does not have the lowest temperature of all storage battery packs.

An electric device according to the present invention is equipped with a first storage battery pack in order to supply the device with energy. In addition, the device is equipped with a second storage battery pack in order to supply the device with energy. This advantageously increases the maximally possible operating time of the electric device.

In one preferred specific embodiment of the electric device, the device is developed to be operated according to a method of the type described previously. The energy stored in the two storage battery packs then will be optimally used in an advantageous manner. In addition, the storage battery packs will advantageously be operated in such a way that the longest service life possible is achieved.

In one expedient specific embodiment of the electric device, the device includes a circuit system provided to switch between a supply via the first storage battery pack and a supply via the second storage battery pack. This advantageously makes it possible to discharge the storage battery packs not simultaneously but sequentially or in alternation.

In one preferred specific embodiment of the electric device, the first storage battery pack and the second storage battery pack have different internal resistances. The different storage battery packs are then advantageously able to be used for different purposes. For example, a briefly increased power requirement may be satisfied by the storage battery pack having the lowest internal resistance.

In one further refinement of the electric device, the device has a third storage battery pack. This advantageously increases the maximally possible operating time of the electric device even further.

In one specific embodiment of the electric device, this device is a lawn mower. Providing at least one second storage battery pack then advantageously makes it possible to mow a larger lawn area without interruption.

BRIEF DESCRIPTION OF THE DRAWINGS

The present invention described in greater detail below with reference to the figures.

DETAILED DESCRIPTION OF EXAMPLE EMBODIMENTS

Figure 1:
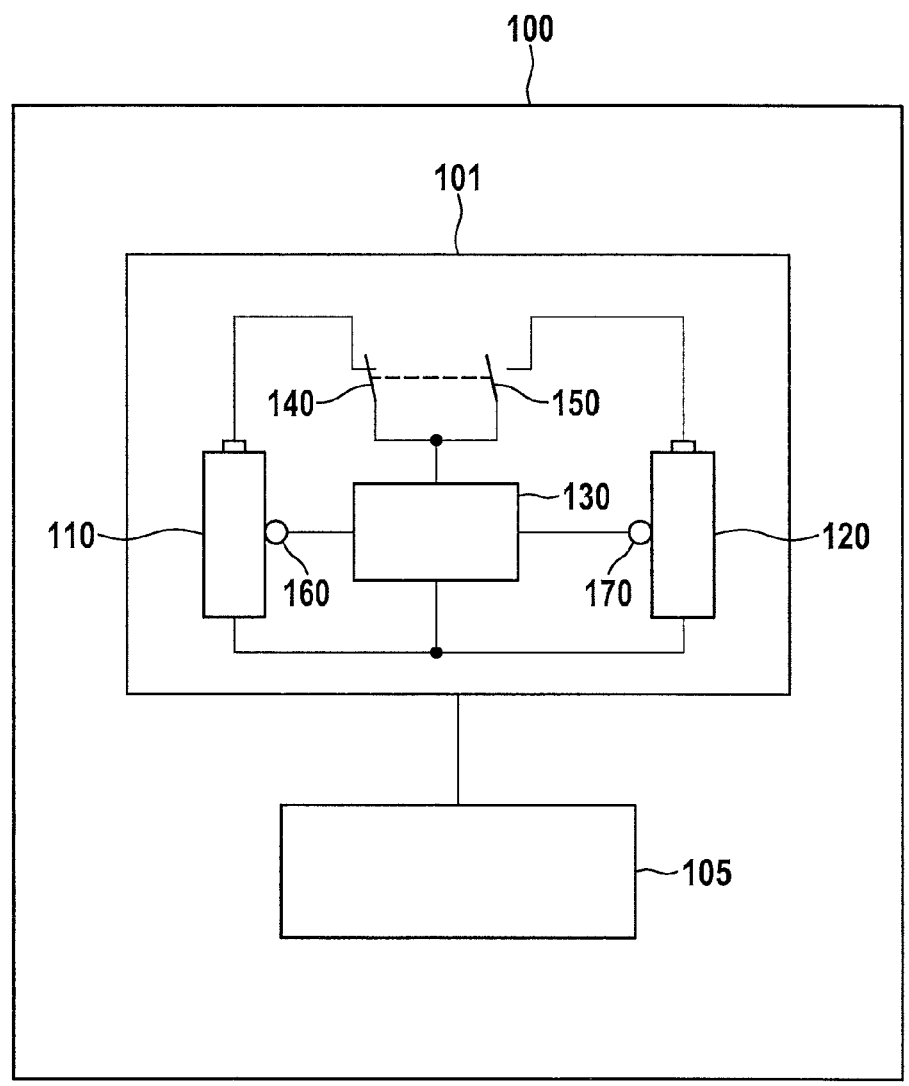
FIG. 1 shows a schematic block diagram of an electric device.

FIG. 1 shows a schematic block diagram of an electric device 100, which is able to be operated independently of a power supply system. Electric device 100, for example, may be a portable electric device such as a tool, a drivable electric device, such as an electrically operated lawn mower, or a stationary or semi-stationary device such as a circular table saw.

Electric device 100 has a first storage battery pack 110 and a second storage battery pack 120. First storage battery pack 110 and second storage battery pack 120 may each include one or more accumulator cells. Preferably, first storage battery pack 110 and second storage battery pack 120 each are encapsulated in a housing in order to protect them from penetrating water. It is equally preferred if first storage battery pack 110 and second storage battery pack 120 are able to be removed from electric device 100. For example, if electric device 100 is a lawn mower, first storage battery pack 110 and second storage battery pack 120 may be accommodated in a device disposed on the upper side of the mower housing and securely fixed in place for the driving operation.

Electric device 100 has an electric load 105 and a circuit system 101. Storage battery packs 110, 120 are provided to operate electrical load 105. For example, electrical load 105 may be an electric drive, such as an electric motor. In other specific embodiments, the electrical load may be an electric heater, for instance.

In addition, electric device 100 has an electrical circuit 130, which is provided to control the discharging of first storage battery pack 110 and second storage battery pack 120, i.e., an operation of the electric load by first storage battery pack 110 and by second storage battery pack 120. Circuit 130 is connected to a first switch 140 and a second switch 150 for this purpose. If first switch 140 is closed, first storage battery pack 110 is discharged. If second switch 150 is closed, second storage battery pack 120 is discharged. Circuit 130 and switches 140, 150 are developed in such a way that no more than one of switches 140, 150 may be closed at any given time. The particular other switch 140, 150 then is open. This ensures that storage battery packs 110, 120 are not discharged simultaneously.

Circuit 130 of electric device 100 is developed to discharge storage battery packs 110, 120 as a function of the temperatures of storage battery packs 110, 120 and/or the internal resistances of storage battery packs 110, 120. Circuit 130 is connected to a first temperature sensor 160 and a second temperature sensor 170 for this purpose. First temperature sensor 160 is provided to detect a temperature of first storage battery pack 110. Second temperature sensor 170 is provided to detect a temperature of second storage battery pack 120. In addition, circuit 130 may be connected to devices for determining the electrical internal resistances of storage battery packs 110, 120. The internal resistances of storage battery packs 110, 120, for example, may be measured for this purpose. However, the internal resistances of storage battery packs 110, 120 may also be encoded in data fields situated on or in storage battery packs 110, 120, and read out by circuit 130. In addition, it is also possible to store the internal resistances of storage battery packs 110, 120 in circuit 130 on a permanent basis.

Figure 2:
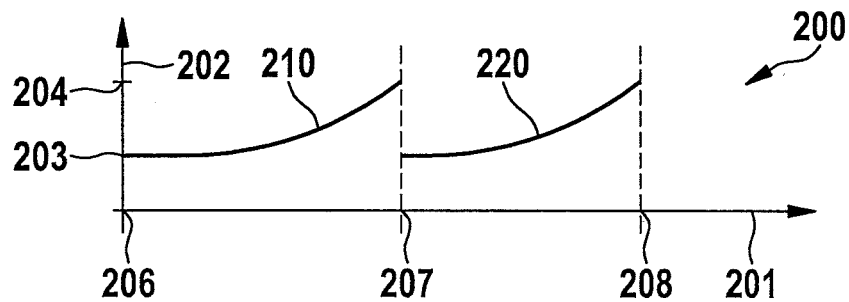
FIG. 2 shows a first discharge scheme.

FIG. 2, in a schematized illustration, shows a first possible discharge scheme 200 for discharging first storage battery pack 110 and second storage battery pack 120. A time 201 has been plotted on a horizontal axis of the graph shown in FIG. 2. Temperatures 202 of storage battery packs 110, 120 have been plotted on a vertical axis. First discharge scheme 200 is based on the scenario that both first storage battery pack 110 and second storage battery pack 120 have the same low temperature 203 at a first instant 206. For example, the temperatures may be considered to be the same if they differ by less than 2° C.

Circuit 130 initially begins with a discharge of first storage battery pack 110, at first instant 206, in order to operate electric device 100, first storage battery pack 110 having been picked at random. Because of the discharging of first storage battery pack 110, the temperature of first storage battery pack 110 rises according to a temperature characteristic 210, until it reaches a limit temperature 204 at a second instant 207. Limit temperature 204, from which point on permanent worsening of the electric characteristics of storage battery packs 110, 120 is to be expected, is a temperature that depends on the type of storage battery packs 110, 120.

At second instant 207, first storage battery pack 110 has warmed to limit temperature 204. However, second storage battery pack 120 still is at low temperature 20. Therefore, circuit 130 of electric device 100 switches to a supply via second storage battery pack 120 at second instant 207. This now causes second storage battery pack 120 to heat up according to a temperature characteristic 220, until second storage battery pack 120 has reached limit temperature 204 at a third instant 208 and must be switched off.

If first storage battery pack 110 has cooled down sufficiently in the period between second instant 207 and third instant 208, then a switch back to a supply via first storage battery pack 110 is possible again at third instant 208. Otherwise, electric device 100 must be switched off completely.

Figure 3:
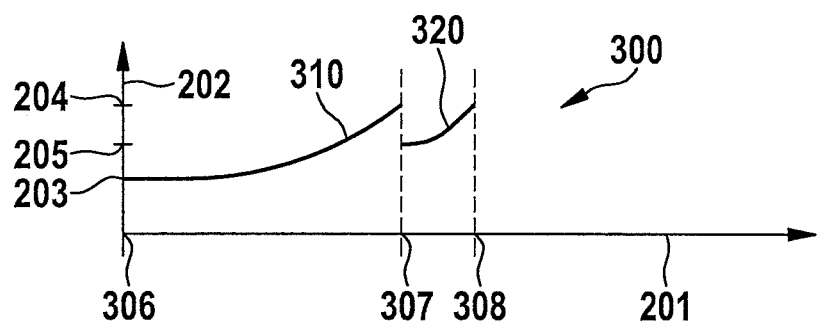
FIG. 3 shows a second discharge scheme.

FIG. 3, in a schematic representation, shows a second potential discharge 300 for discharging storage battery packs 110, 120 of electric device 100. Second discharge scheme 300 is based on the situation that first storage battery pack 110 has low temperature 203 at a first instant 306, but second storage battery pack 120 has a medium temperature 205 which, however, is higher than low temperature 203.

At first instant 306, circuit 130 of electric device selects first storage battery pack 110 for the discharge, since it has the lower temperature. While first storage battery pack 110 is discharged, the temperature of first storage battery pack 110 rises according to a first characteristic 310, until the temperature of first storage battery pack 110 has reached limit temperature 204 again at second instant 307. At second instant 307, circuit 130 therefore switches to a supply via second storage battery pack 120. While second storage battery pack 120 is discharged, its temperature rises according to a second characteristic 320, until second storage battery pack 120 likewise has reached limit temperature 204 at third instant 308. If first storage battery pack 110 has cooled down sufficiently in the period leading up to third instant 308, a switch back to a supply via first storage battery pack 110 will be possible again at third instant 308. Otherwise, electric device 100 must be switched off completely at third instant 308.

Figure 4:
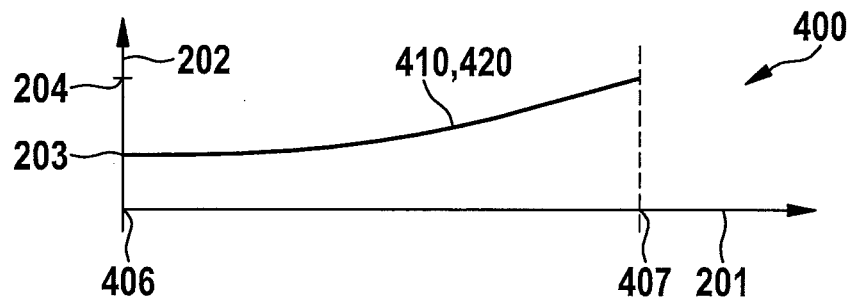
FIG. 4 shows a third discharge scheme.

FIG. 4 shows a third potential discharge scheme 400 for discharging storage battery packs 110, 120 of electric device 100. Like first discharge scheme 200 from FIG. 2, third discharge scheme 400 is based on the scenario that first storage battery pack 110 and second storage battery pack 120 both have the same low temperature 203 at a first instant 406. For example, the temperatures may be considered to be the same if they differ by less than 2° C.

According to third discharge scheme 400, however, it is not the case that first storage battery pack 110 is discharged by itself until it has reached limit temperature 204. Instead, according to third discharge scheme 400, there is a switch at short time intervals between the discharging of first storage battery pack 110 and the discharging of second storage battery pack 120, starting at first instant 406. This switch preferably takes place more often than once a minute. Especially preferably, this switchover occurs more often than once in half a minute, e.g., every five seconds, every ten seconds, or every 20 seconds. When choosing the time intervals, a balance must be struck between the most uniform discharging and heating of storage battery packs 110, 120 by means of short time intervals, and a minimization of the switchover losses by choosing longer time intervals.

Because of the regular switch between first storage battery pack 110 and second storage battery pack 120, first storage battery pack 110 and second storage battery pack 120 heat up uniformly, according to temperature characteristics 410, 420. The heating lasts until both storage battery packs 110, 120 reach limit temperature 204 at a second instant 407, and electric device 100 must be shut off. However, since each storage battery pack 110, 120 is able to cool down again while the particular other storage battery pack 120, 110 is discharged, the interval between first instant 406 and second instant 407 in third discharge scheme 400 is greater than the interval between first instant 206 and third instant 208 in first discharge scheme 200 of FIG. 2. As a result, third discharge scheme 400 is preferred over first discharge scheme 200.

Another advantage of third discharge theme 400 is that both storage battery packs 110, 120 have approximately the same charge state at any given time, due to the short intervals of the alternating operation of first storage battery pack 110 and second storage battery pack 120. As a result, an operator of electric device 100 does not notice any change in output when switching between storage battery packs 110, 120.

Figure 5:
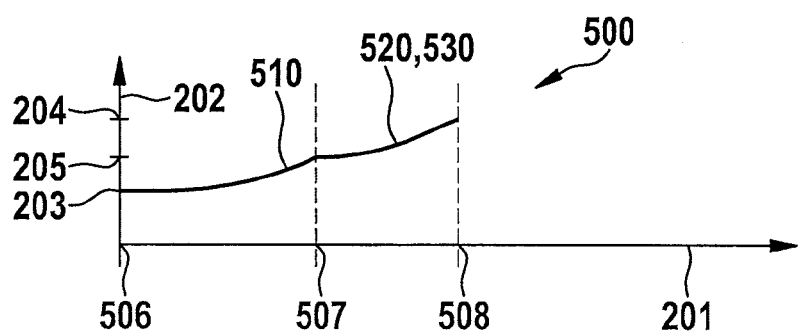
FIG. 5 shows a fourth discharge scheme.

FIG. 5 shows a fourth potential discharge scheme 500 for discharging storage battery packs 110, 120 of electric device 100. Like second discharge scheme 300, fourth discharge theme 500 once again is based on the fact that first storage battery pack 110 has low temperature 203 at a first instant 506, while second storage battery pack 120, at second instant 506, is already at medium temperature 205, which is higher than low temperature 203. At first instant 506, circuit 130 of electric device 100 thus selects the storage battery pack having the lower temperature, i.e., first storage battery pack 110, for the discharge. While first storage battery pack 110 is discharged, its temperature rises according to a first temperature characteristic 510. At a second instant 507, first storage battery pack 110 likewise has reached medium temperature 205. At second instant 507, first storage battery pack 110 and second storage battery pack 120 therefore have the same temperature. The same temperature in this context means that the temperatures of storage battery packs 110, 120 determined by temperature sensors 160, 170 differ by less than a specified threshold value of 2° C., for example.

At second instant 507, circuit 130 starts discharging storage battery packs 110, 120 in alternation. Once again, the intervals between a switch between storage battery packs 110, 120 may lie between approximately 5 seconds and one minute. Due to the alternating discharging of storage battery packs 110, 120, the temperatures of storage battery packs 110, 120 rise in the same way, according to a further characteristic 520 of the first storage battery temperature, and a characteristic 530 of the second storage battery temperature.

At a third instant 508, first storage battery pack 110 and second storage battery pack 120 reach limit temperature 204. As a result, electric device 100 must be switched off at third instant 508. Since the particular storage battery pack 110, 120 not operating just then is able to cool in the interval between second instant 507 and third instant 508, the rise in temperature according to temperature characteristics 520, 530 slows down. As a result, the time interval between first instant 506 and third instant 508 in fourth discharge scheme 500 is greater than the time interval between first instant 306 and third instant 308 in second discharge scheme 300 of FIG. 3. Fourth discharge scheme 500 consequently is preferred over second discharge scheme 300.

In one further refinement of electric device 100 and the method implemented by circuit 130 for discharging storage battery packs 110, 120, it is also possible to take internal resistances of storage battery packs 110, 120 into account. A higher internal resistance of a storage battery pack 110, 120 means greater heating of the particular storage battery pack 110, 120 when storage battery packs 110, 120 are discharged. When both storage battery packs 110, 120 are at a temperature close to limit temperature 204, it is therefore possible to use storage battery pack 110, 120 having the lower internal resistance.

Storage battery pack 110, 120 having the lower internal resistance may also be used if electric device 100 briefly requires a high electric output. If a current intensity requested by electric device 100 rises to a value of 80 A or 120 A, for instance, a switch to storage battery pack 110, 120 having the lower internal resistance may take place, regardless of the temperatures of storage battery packs 110, 120.

In one additional refinement of the method, a switch between storage battery packs 110, 120 may also take place with respect to large and small loads of electric device 100. In this further refinement, electric device 100 has at least two differently dimensioned electric loads, e.g., a weaker electric motor and a stronger electric motor. Both loads of electric device 100 may be operated simultaneously. Each of the electric loads is able to be operated by each of storage battery packs 110, 120. The method then is developed in such a way that warmer storage battery pack 110, 120 is used to operate the smaller electric load of electric device 100, and cooler storage battery pack 110, 120 is used to operate the higher electric load of electric device 100.

Figure 6:
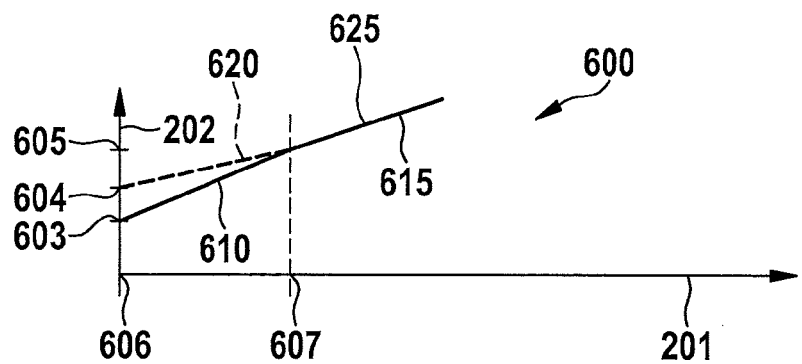
FIG. 6 shows a fifth discharge scheme.

FIG. 6 shows a fifth discharge scheme 600 to explain this method. At a first instant 606, first storage battery pack 110 has a first temperature 603. Second storage battery pack 120, at first instant 606, has a second temperature 604, which is higher than first temperature 603. Therefore, starting at first instant 606, first storage battery pack 110 is used for operating the larger electric load of device 100, and second storage battery pack 120 is used for operating the smaller electric load of device 100.

The temperature of first storage battery pack 110 subsequently rises according to a first temperature characteristic 610, while the temperature of second storage battery pack 120 rises according to a flatter, second temperature characteristic 620. Steeper temperature rise 610 of first storage battery pack 110 is due to the fact that first storage battery pack 110 must provide a higher output. At a second instant 607, both storage battery packs 110, 120 reach a third temperature 605, which is higher than first temperature 603 and second temperature 604.

At second instant 607, storage battery packs 110, 120 thus are at approximately the same temperature, the above explanations regarding the definition of temperature equality applying analogously. Starting at second instant 607, first storage battery pack 110 and second storage battery pack 120 take turns in operating the smaller electric load and the higher electric load. As a result, starting at second instant 607, the temperature of first storage battery pack 110 rises according to a further temperature characteristic 615, while the temperature of second storage battery pack 120 rises according to a second further temperature characteristic 625. Further temperature characteristics 615, 625 both have the same gradient, since storage battery packs 110, 120 take turns in operating the two electric loads.

In one further development of electric device 100, electric device 100 may be used even if only one storage battery pack 110, 120 is employed.

In one additional further refinement of electric device 100, electric device 100 has a third storage battery pack and/or still further storage battery packs. In this further refinement of electric device 100, as well, circuit 130 of electric device 100 is developed to preferably discharge the particular storage battery pack having the lowest temperature. If the storage battery packs of electric device 100 all have approximately the same temperature, i.e., if the temperatures deviate by less than 2° C., for example, a switch between the individual storage battery packs of electric device 100 preferably takes place at short time intervals.

What is claimed is:

1. A method for operating an electric device, the device having a first storage battery pack, a second storage battery pack and an electrical load, the method comprising:
   discharging no more than one storage battery pack at any given time to operate the load; and
   selecting the storage battery pack to be discharged at least one of:
   i) as a function of a temperature of the first storage battery pack and a temperature of the second storage battery pack, and
   ii) as a function of an internal resistance of the first storage battery pack and an internal resistance of the second storage battery pack,
   wherein a discharge of a respective storage battery pack is terminated when a temperature of the respective storage battery pack reaches a specified threshold value, and when the temperature of the respective storage battery pack reaches the specified threshold value, a discharge of the other storage battery pack is initiated,
   wherein the storage battery pack having the lowest temperature is discharged initially.

2. A method for operating an electric device, the device having a first storage battery pack, a second storage battery pack and an electrical load, the method comprising:
   discharging no more than one storage battery pack at any given time to operate the load; and
   selecting the storage battery pack to be discharged at least one of:
   i) as a function of a temperature of the first storage battery pack and a temperature of the second storage battery pack, and
   ii) as a function of an internal resistance of the first storage battery pack and an internal resistance of the second storage battery pack,
   wherein a discharge of a respective storage battery pack is terminated when a temperature of the respective storage battery pack reaches a specified threshold value, and when the temperature of the respective storage battery pack reaches the specified threshold value, a discharge of the other storage battery pack is initiated,
   wherein the first storage battery pack and the second storage battery pack are discharged in alternation when the temperature of the first storage battery pack and the temperature of the second storage battery pack differ by less than a specified threshold value from each other.

3. The method as recited in claim 2, wherein a change between the first storage battery pack and the second storage battery pack takes place more frequently than once per minute.

4. The method as recited in claim 1, wherein the storage battery pack having lowest internal resistance is discharged if a required electrical output exceeds a specified threshold value.

5. A method for operating an electric device, the device having a first storage battery pack, a second storage battery pack and an electrical load, the method comprising:
   discharging no more than one storage battery pack at any given time to operate the load; and
   selecting the storage battery pack to be discharged at least one of:
   i) as a function of a temperature of the first storage battery pack and a temperature of the second storage battery pack, and
   ii) as a function of an internal resistance of the first storage battery pack and an internal resistance of the second storage battery pack,
   wherein the first storage battery pack and the second storage battery pack are discharged in alternation when the temperature of the first storage battery pack and the temperature of the second storage battery pack differ by less than a specified threshold value from each other,
   wherein discharge of the first and second storage battery packs in alternation is terminated when the temperature of the first or second storage battery pack reaches the specified threshold value.

6. A method for operating an electric device, the device having a first storage battery pack, a second storage battery pack and an electrical load, the method comprising:
   discharging no more than one storage battery pack at any given time to operate the load; and
   selecting the storage battery pack to be discharged at least one of:
   i) as a function of a temperature of the first storage battery pack and a temperature of the second storage battery pack, and
   ii) as a function of an internal resistance of the first storage battery pack and an internal resistance of the second storage battery pack, wherein a discharge of a respective storage battery pack is terminated when a temperature of the respective storage battery pack reaches a specified threshold value, and when the temperature of the respective storage battery pack reaches the specified threshold value, a discharge of the other storage battery pack is initiated, wherein discharge of the other storage battery pack is terminated when a temperature of the other storage battery pack reaches a specified threshold value.

7. The method as recited in claim 6, wherein, when the temperature of the other storage battery pack reaches the specified threshold temperature and discharge of the other storage battery pack is terminated, a discharge of the first battery pack is initiated if the temperature of the first battery pack is below the specified threshold temperature.

8. The method as recited in claim 6, wherein, when the temperature of the other storage battery pack reaches the specified threshold temperature and discharge of the other storage battery pack is terminated, operating the electric device is terminated.

* * * * *